(12) United States Patent
Robertson, Jr. et al.

(10) Patent No.: US 9,140,135 B2
(45) Date of Patent: Sep. 22, 2015

(54) METALLIC RADIUS BLOCK FOR COMPOSITE FLANGE

(75) Inventors: Thomas J. Robertson, Jr., Glastonbury, CT (US); Darin S. Lussier, Berlin, CT (US)

(73) Assignee: United Technologies Corporation, Hartford, CT (US)

( * ) Notice: Subject to any disclaimer, the term of this patent is extended or adjusted under 35 U.S.C. 154(b) by 735 days.

(21) Appl. No.: 12/892,037

(22) Filed: Sep. 28, 2010

(65) Prior Publication Data

US 2012/0076647 A1 Mar. 29, 2012

(51) Int. Cl.
| | |
|---|---|
| *F01D 25/24* | (2006.01) |
| *F01D 9/04* | (2006.01) |
| *F02K 3/06* | (2006.01) |
| *B29C 65/48* | (2006.01) |
| *B29C 65/56* | (2006.01) |
| *F01D 21/04* | (2006.01) |
| *B29C 57/00* | (2006.01) |
| *B29L 31/00* | (2006.01) |
| *B29C 65/00* | (2006.01) |
| *F16B 5/04* | (2006.01) |
| *F16B 11/00* | (2006.01) |

(52) U.S. Cl.
CPC ............ *F01D 21/045* (2013.01); *F01D 25/243* (2013.01); *F02K 3/06* (2013.01); *B29C 57/00* (2013.01); *B29C 65/48* (2013.01); *B29C 65/562* (2013.01); *B29C 66/1222* (2013.01); *B29C 66/1228* (2013.01); *B29C 66/5344* (2013.01); *B29C 66/721* (2013.01); *B29C 66/742* (2013.01); *B29L 2031/7504* (2013.01); *F05D 2300/603* (2013.01); *F16B 5/04* (2013.01); *F16B 11/006* (2013.01)

(58) Field of Classification Search
CPC ....... F01D 21/045; F01D 21/243; F02K 3/06; F16B 11/006; F16B 5/04; B29L 2013/7504; B29C 57/00; B29C 65/48; B29C 65/562; B29C 66/1222; B29C 66/1228; B29C 66/5344; B29C 66/721; B29C 66/742
USPC ............ 415/9, 182.1, 196, 200, 213.1, 214.1, 415/215, 220
See application file for complete search history.

(56) References Cited

U.S. PATENT DOCUMENTS 4,205,927 A * 6/1980 Simmons ........................ 403/337
4,750,961 A * 6/1988 Pflug et al. ..................... 156/212
(Continued)

FOREIGN PATENT DOCUMENTS

| EP | 2290197 A2 | 3/2011 |
| GB | 2406627 A | 4/2006 |

(Continued)

OTHER PUBLICATIONS

Extended European Search Report for EP Application No. 11182794.5 dated Apr. 15, 2014.

*Primary Examiner* — Edward Look
*Assistant Examiner* — Christopher R Legendre
(74) *Attorney, Agent, or Firm* — Carlsbad, Gaskey & Olds, P.C.

(57) ABSTRACT

A disclosed fan containment case includes a fan case fabricated from a plurality of non-metallic composite layers with an attachment flange formed of both a composite portion and a metallic backing. The disclosed metallic backing is mounted on a rearward facing surface of a composite portion of the attachment flange.

15 Claims, 3 Drawing Sheets

(56) References Cited

U.S. PATENT DOCUMENTS

| | | | |
|---|---|---|---|
| 5,468,331 A * | 11/1995 | Makarenko et al. | 156/494 |
| 5,653,408 A * | 8/1997 | Kuhn et al. | 246/470 |
| 6,123,170 A * | 9/2000 | Porte et al. | 181/214 |
| 6,467,988 B1 * | 10/2002 | Czachor et al. | 403/337 |
| 6,471,485 B1 * | 10/2002 | Rossmann et al. | 416/230 |
| 6,857,669 B2 * | 2/2005 | Porte et al. | 285/368 |
| 7,141,199 B2 * | 11/2006 | Sana et al. | 264/255 |
| 7,387,277 B2 * | 6/2008 | Kordel et al. | 244/123.5 |
| 7,402,022 B2 * | 7/2008 | Harper et al. | 415/9 |
| 7,530,757 B2 * | 5/2009 | Toda et al. | 403/23 |
| 7,611,595 B2 * | 11/2009 | Barnes | 156/148 |
| 7,749,927 B2 * | 7/2010 | Blanton et al. | 442/381 |
| 8,079,773 B2 * | 12/2011 | Blanton | 403/335 |
| 8,142,144 B2 * | 3/2012 | Porte et al. | 415/200 |
| 8,721,278 B2 * | 5/2014 | Shteyman et al. | 415/214.1 |
| 2005/0252195 A1 * | 11/2005 | Porte et al. | 60/226.1 |
| 2007/0086854 A1 * | 4/2007 | Blanton | 403/338 |
| 2007/0292274 A1 * | 12/2007 | Burdgick et al. | 416/229 A |
| 2008/0063508 A1 | 3/2008 | Barnett et al. | |
| 2008/0069688 A1 * | 3/2008 | Harper et al. | 415/196 |
| 2008/0078612 A1 * | 4/2008 | Strunk | 181/214 |
| 2008/0115454 A1 | 5/2008 | Xie | |
| 2008/0118683 A1 * | 5/2008 | Xie | 428/34.5 |
| 2008/0206044 A1 * | 8/2008 | Porte et al. | 415/119 |
| 2009/0010755 A1 | 1/2009 | Keller et al. | |
| 2009/0098337 A1 * | 4/2009 | Xie et al. | 428/121 |
| 2009/0255589 A1 * | 10/2009 | Porte et al. | 137/15.1 |
| 2010/0000227 A1 * | 1/2010 | Porte et al. | 60/796 |
| 2011/0052383 A1 * | 3/2011 | Lussier | 415/200 |
| 2011/0168839 A1 * | 7/2011 | Porte et al. | 244/1 N |
| 2012/0076647 A1 * | 3/2012 | Robertson et al. | 415/182.1 |
| 2012/0148392 A1 * | 6/2012 | Lussier et al. | 415/200 |
| 2012/0270006 A1 * | 10/2012 | McMillan | 428/77 |
| 2013/0202430 A1 * | 8/2013 | Gaudry et al. | 415/214.1 |
| 2013/0266431 A1 * | 10/2013 | Moram et al. | 415/182.1 |
| 2014/0044539 A1 * | 2/2014 | Harada et al. | 415/214.1 |
| 2014/0079895 A1 * | 3/2014 | Foster et al. | 428/34.1 |
| 2014/0133977 A1 * | 5/2014 | Billault | 415/214.1 |

FOREIGN PATENT DOCUMENTS

| | | |
|---|---|---|
| JP | H09242957 A | 9/1997 |
| WO | 2011/138571 A1 | 11/2011 |

* cited by examiner

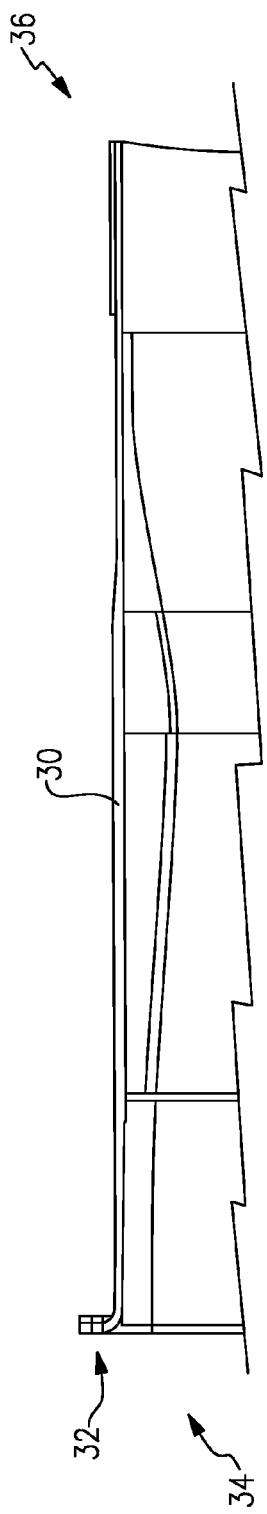
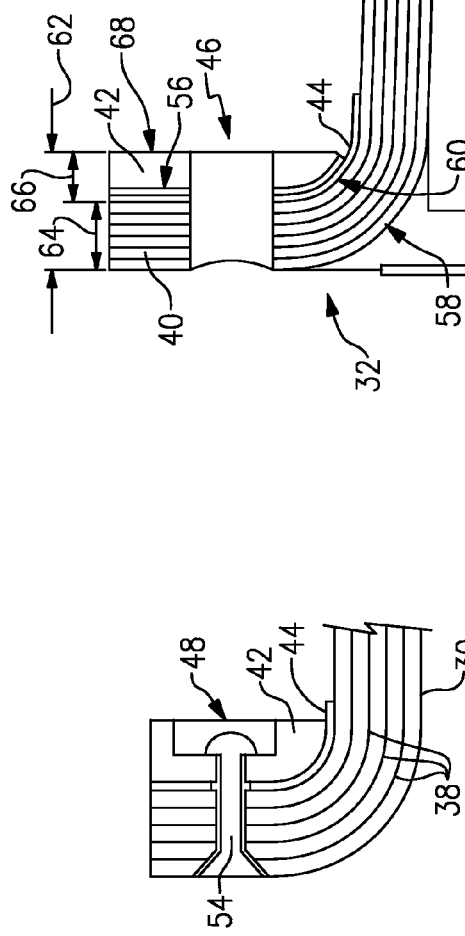
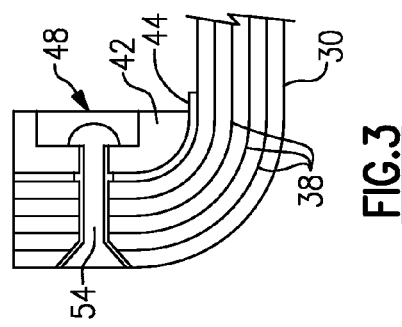

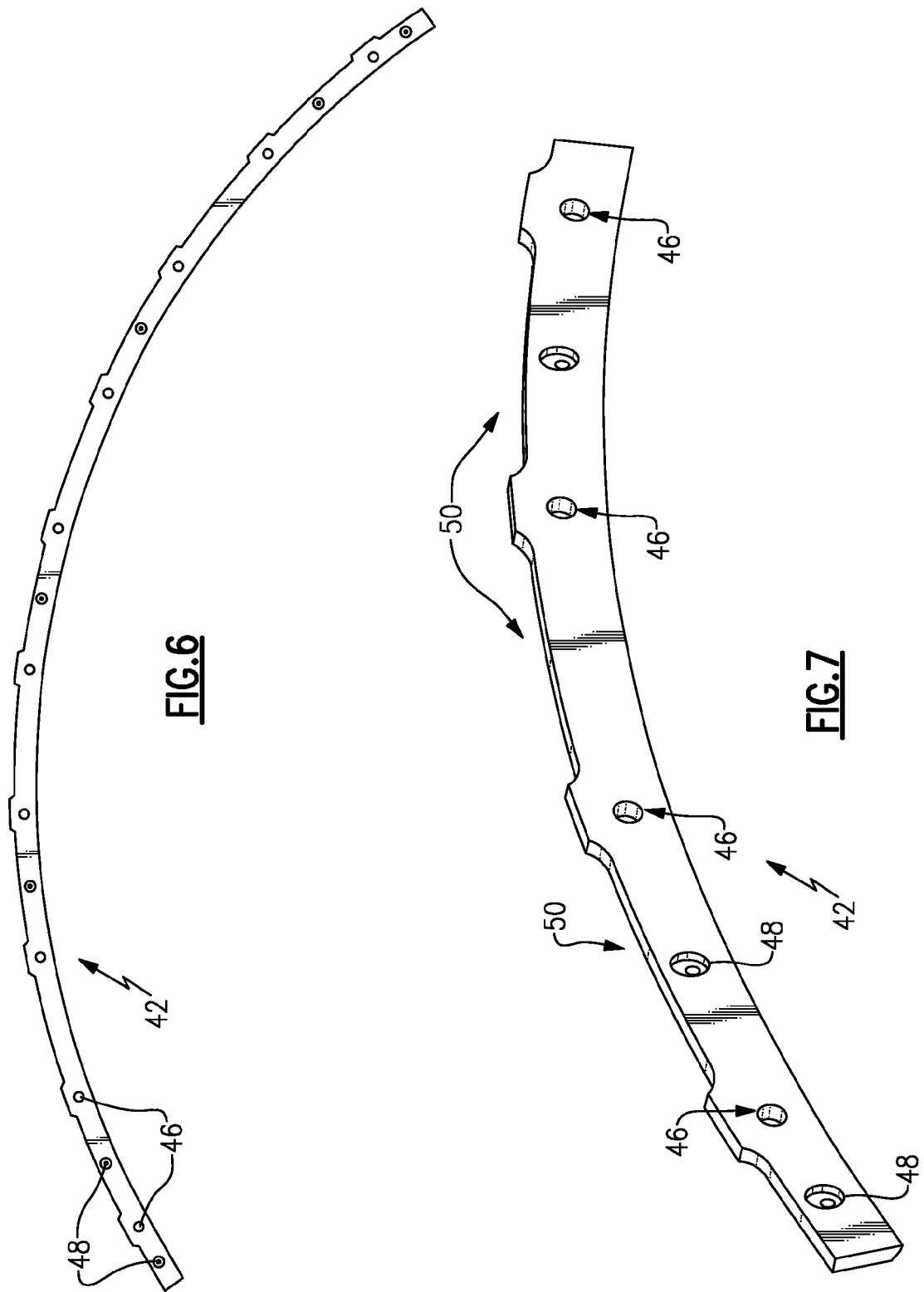

METALLIC RADIUS BLOCK FOR COMPOSITE FLANGE

BACKGROUND

This disclosure generally pertains to an attachment flange for a composite fan case. Furthermore, this disclosure relates to a metallic attachment flange component for a composite fan case.

A gas turbine engine can include a fan section including fan blades surrounded by a fan case supported within a nacelle. The function of the fan case is to contain any fractured and separated parts of the fan blades to prevent portions from leaving the fan nacelle. Metallic fan cases can be undesirably heavy to perform this containment function. A composite fan case constructed of non-metallic materials can reduce weight and provide the same capability as a metallic fan case. However, composite fan cases can require complicated configurations to provide the desired strength and durability. Moreover, composite material manufacturing and forming techniques are limited in the range of tolerances that can be reliably obtained.

SUMMARY

An example disclosed fan containment case includes a fan case fabricated from a plurality of non-metallic composite layers with an attachment flange formed of both a composite portion and a metallic backing.

The example metallic backing is mounted on a rearward facing surface of the composite portion of the attachment flange. The disclosed metallic backing includes a plurality of segments that combine to encircle the fan case on the attachment flange. The example metallic backings are secured to the attachment flange adhesive and/or mechanical fasteners. The metallic backing provides a desired compression strength and durability along with the use of conventional machining processes to attain a desired total thickness of the attachment flange within desired tolerance limits.

These and other features disclosed herein can be best understood from the following specification and drawings, the following of which is a brief description.

BRIEF DESCRIPTION OF THE DRAWINGS

FIG. 3 is a sectional view of the example containment case.

FIG. 4 is an enlarged view of an example attachment flange of the example containment case.

FIG. 5 is an enlarged cross-section of a portion of the example attachment flange.

FIG. 6 is a front view of an example metallic backer segment.

FIG. 7 is a perspective view of the example metallic backer segment.

DETAILED DESCRIPTION

Figure 1:
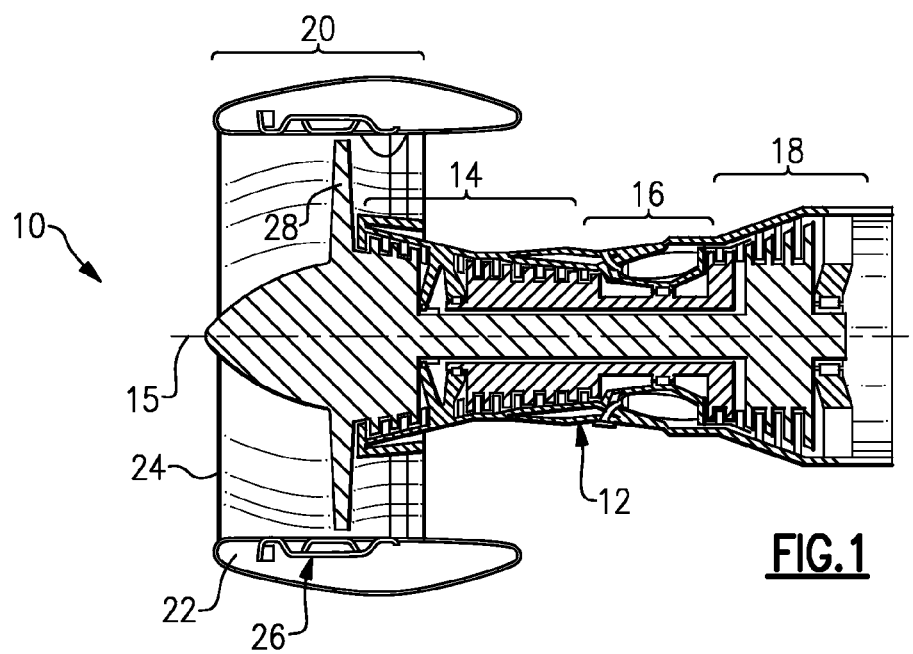
FIG. 1 is a schematic view of an example gas turbine engine.

Referring to FIG. 1, a gas turbine engine is schematically indicated at 10 and includes a core 12 having a compressor section 14, a combustion section 16 and a turbine section 18. The example gas turbine engine 10 includes a fan section 20 that is disposed within a nacelle 22 and includes a plurality of blades 28. The compressor, combustion, turbine, and fan sections 14, 16 18 and 20 are arranged about an axis 15. The nacelle 22 defines an inlet 24 for incoming airflow. A fan containment case 26 is disposed proximate the blades 28 in the fan section 20.

Figure 2:
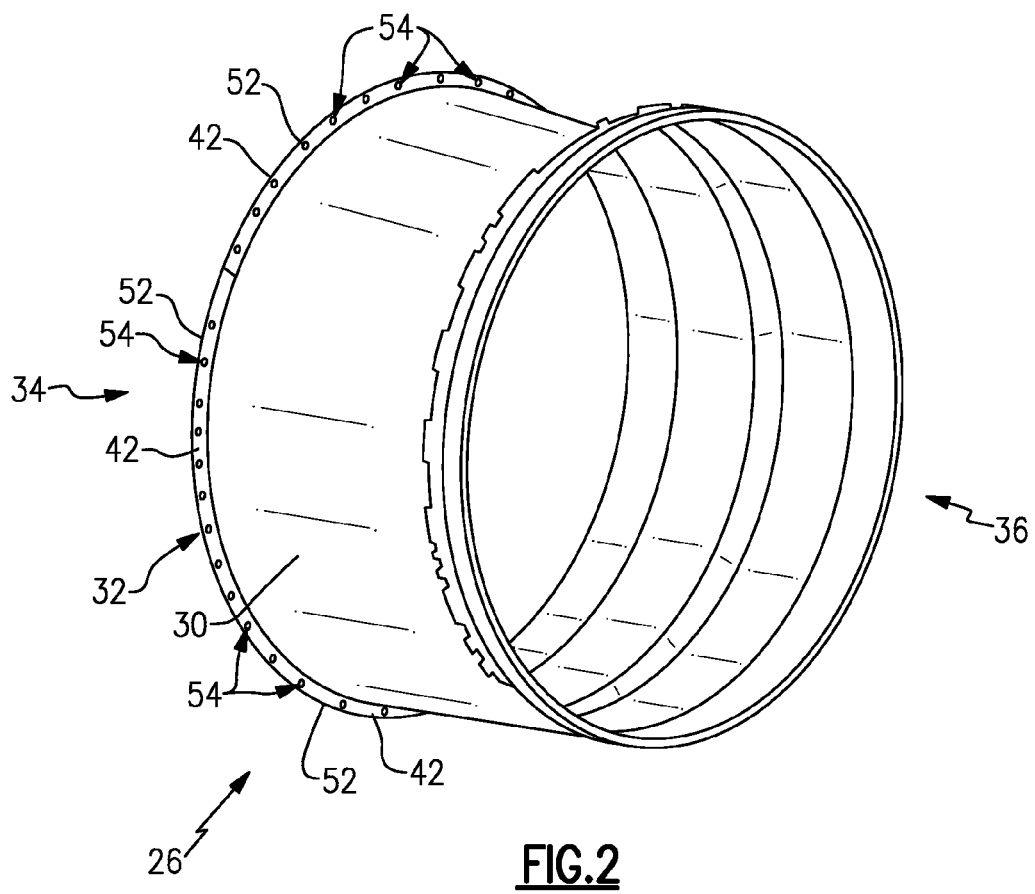
FIG. 2 is a perspective view of an example containment case.

Referring to FIG. 2, the example fan containment case 26 includes a generally cylindrically shaped fan case 30 that extends between an open front end 34 and an open rear end 36. The example fan case 30 is fabricated from a plurality of non-metallic composite layers 38 (FIG. 4). The front end 34 includes an attachment flange 32 that is formed of the plurality of composite layers 38. A metallic backing 42 is secured to the attachment flange 32.

The example metallic backing 42 is fabricated from an aluminum material and is mounted on an axially rearward facing surface of the attachment flange 32. The example metallic backing 42 consists of a plurality of segments 52 that combine to encircle the fan case 30 on the attachment flange 32. In the disclosed example, the metallic backing 42 includes four segments 52 disposed about the circumference of the fan case 30 and secured to the attachment flange 32.

The attachment flange 32 includes openings 46 (best shown in FIG. 5) that extend through the metallic backing 42 and the composite attachment flange 32. The openings 46 are provided for the fasteners (not shown) utilized for securing the containment case 26 within the nacelle 22. The rear end 36 of the fan case 26 does not include an attachment flange and is secured to the nacelle structure 22 using other attachment and securement methods. However, it is within the contemplation of this disclosure that an attachment flange 32 may be disposed on each of the front and rear ends 34, 36 in order to secure the fan case 30 within the nacelle structure 22.

Referring to FIG. 3 with continued reference to FIG. 2, the example metallic backings 42 are secured to the attachment flange 32 with an adhesive 56 and/or mechanical fasteners 54. The example mechanical fasteners 54 comprises rivets that extend through the metallic backing 42 and into the composite portion of the attachment flange 32. The metallic backing includes counter-bore holes 48 that receive the entire head of the rivet 54 such that the rivet head does protrude from the metallic backing 42.

Referring to FIGS. 4 and 5 with continued reference to FIG. 2, the fan case 30 includes the front end 34 that is defined by the example attachment flange 32. The attachment flange 32 includes a radially upward extending composite portion 40. This radially upward extending composite portion 40 is formed from some or all of the plurality of layers 38 of the fan case 30. The composite portion 40 includes the composite material that is non-metallic and therefore is formed utilizing known composite manufacturing techniques.

The example composite portion 40 extends radially upward with a bend radius 58 that is determined according to the material properties of the composite layers 38 to provide the desired strength and formation of the attachment flange 32. Disposed between the metallic backing 42 and the composite portion 40 is a galvanic corrosion barrier 44. The combination of the metallic backing 42 with the composite portion 40 creates a galvanic corrosion condition encountered by responsive to direct contact between the two materials. The galvanic corrosion barrier 44 prevents degradation that may be caused by the galvanic incompatibility of the materials. The adhesive 56 is disposed between the galvanic barrier 44 and the metallic backing 42 to hold the metallic backing 42 in place during assembly and operation.

The metallic backing 42 and the composite portion 40 define openings 46 for fasteners utilized to secure the containment case 26 within the nacelle 22. The metallic backing 42 includes a radius 60 that corresponds to the radius 58 of the composite portion 40. The radius 60 provides for the positioning of the metallic backing 42 further downwardly towards the outer surface of the fan case 30. Moreover, the radius 58 provides an increased area of compression contact in the radius to provide a desired increase in compression strength.

Referring to FIGS. 6 and 7 with continued reference to FIG. 2, the metallic backing 42 is shown and includes several features to maintain the desired structural integrity while reducing overall weight. The example metallic backing 42 is formed from an aluminum alloy to provide a desired strength to weight ratio. Each segment 52 of the metallic backing 42 may include scalloped portions 50. The scalloped portions 50 are areas where material is removed to reduce the overall weight of each of the metallic backing 42.

Referring to FIG. 3, with continued reference to FIGS. 6 and 7, the metallic backing 42 is secured to the attachment flange 32 by way of the adhesive 56 that is applied between the composite portion 40 and the metallic backing 42. The example adhesive 56 is applied to the front surface of the metallic backing 42 that will be placed in contact with the galvanic corrosion barrier 44 on the axially rearward facing surface of the composite portion 40.

In addition to the adhesive 56, the mechanical fasteners 54 (FIG. 2) are utilized to secure the metallic backing 42 to the composite portion 40 of the attachment flange 32. The example mechanical fasteners 54 are rivets secured through counter-bore holes 48 arranged at intervals along the length of each metallic backing 42. The counter-bore holes 48 allow for attachment of the rivets 54 without disrupting the rear axially facing surface of the metallic backing 42 during assembly and secondary machining.

Metallic backing 42 is provided in segments 52 to allow for manufacturability and installation to the fan case 30. In the disclosed example, there are four segments 52 (FIG. 2) of metallic backing 42 that are applied and attached to the attachment flange 32. Each segment 52 comprises a circumferential portion that combine to encircle the fan case 30 and form a semi-continuous mounting surface along the entire rearward facing surface of the attachment flange 32.

The metallic backing 42 is metallic part and therefore is readily machinable by common manufacturing methods. Therefore, the metallic backing 42 provides a surface from which material can be removed to set a desired thickness 62 of the attachment flange 32. As appreciated, the desired thickness 62 of the attachment flange 32 is difficult to attain merely through the use of composite materials. Composite materials are not easy to machine compared to the metallic material comprising the metallic backing 42.

The example fan containment case 26 is fabricated by first producing the example fan case 30 to include the attachment flange portion 40 that extends radially upward. The composite portion 40 of the attachment flange 32 includes the radius 58 that terminates at a first thickness 64. This first thickness 64 is formed within a desire tolerance range compatible with the composite material forming process. A second thickness 66 of the of the metallic backing 42 is provided such that sufficient material is provided in view of the tolerance range of the first thickness 64 defined by the composite material forming process. In other words, sufficient material is provided in the second thickness 66 of the metallic backing 42 such that a rear face 68 is machined to attain the desired total thickness 62 of the attachment flange 32. The metallic backing 42 because it is machinable by known and substantially standard conventional machining methods allows for the tailoring of the thickness 62 of the attachment flange 32 beyond the limits capable with only composite material fabrication techniques.

The galvanic corrosion barrier 44 is attached to the composite portion 40 followed by attachment of the metallic backing 42 with the adhesive 56. Rivets 54 are then utilized to further attach the metallic backing 42 to the composite portion 40. The rivets 54 are attached within the counter-bore holes 48 such that the rivets 54 do not interfere with subsequent machining steps. Once the metallic backing 42 is attached to the composite portion 40, the back surface 68 is machined to obtain the desired total thickness 62 of the completed attachment flange 32. The machining operation can include any machining operation capable of removing material from the back surface 68 to obtain the total thickness within a desired tolerance range.

Accordingly, the disclosed attachment flange 32 configuration including the metallic backing 42 provides for the tailoring of attachment flange dimensions to obtain desired dimensional repeatability. Moreover, the metallic backing 42 increases compression strength in the attachment flange 42 to facilitate increased durability while also improving manufacture and assembly.

Although an example embodiment has been disclosed, a worker of ordinary skill in this art would recognize that certain modifications would come within the scope of this disclosure. For that reason, the following claims should be studied to determine the scope and content of this invention.

What is claimed is:

1. A gas turbine engine fan section comprising:
   a plurality of composite layers defining a generally cylindrical case;
   an attachment flange extending radially outward from the cylindrical case, the attachment flange comprising a portion of the plurality of composite layers that define the cylindrical case forming a continuous radius turned radially outward transverse to a portion of the same plurality of composite layers defining the cylindrical case;
   a metallic backing secured to the attachment flange, wherein the attachment flange includes a radius on the outer surface of the cylindrical case and the metallic backing includes a corresponding radius;
   at least one fastener securing the metallic backing to the attachment flange, wherein a terminating end of each fastener does not extend upstream beyond the attachment flange;
   a corrosion barrier disposed between the metallic backing and the attachment flange with the metallic backing adhered to the corrosion barrier with an adhesive; and
   a fan section including a plurality of fan blades disposed within the generally cylindrical case.

2. The gas turbine engine fan section as recited in claim 1 including a nacelle disposed about the fan section with the cylindrical case supported by the nacelle.

3. The gas turbine engine fan section as recited in claim 1 wherein the metallic backing comprises at least two separate sections secured to the attachment flange.

4. The gas turbine engine fan section as recited in claim 1, including an adhesive applied between the metallic backing and the attachment flange for securing the metallic backing to the attachment flange.

5. The gas turbine engine fan section as recited in claim 4, wherein the at least one fastener comprises a plurality of rivets.

6. A fan containment case comprising:
   a plurality of composite layers defining a generally cylindrical case;

an attachment flange extending radially outward from the cylindrical case, the attachment flange comprising a portion of the plurality of composite layers that define the cylindrical case forming a continuous radius turned radially outward transverse to a portion of the plurality of composite layers defining the cylindrical case;

a metallic backing secured to the attachment flange; wherein the attachment flange includes a radius on the outer surface of the cylindrical case, wherein the metallic backing includes a radius corresponding to the radius of the attachment flange; and a plurality of rivets for securing the metallic backing to the attachment flange, wherein a terminating end of each of the plurality of rivets does not extend upstream beyond the attachment flange.

7. The fan containment case as recited in claim 6, wherein the metallic backing comprises at least two separate sections secured to the attachment flange.

8. The fan containment case as recited in claim 6, wherein the attachment flange and the metallic backing include a plurality of corresponding openings for receiving fasteners.

9. The fan containment case as recited in claim 6, including an adhesive applied between the metallic backing and the attachment flange for securing the metallic backing to the attachment flange.

10. The fan containment case as recited in claim 9, including a corrosion barrier secured between the metallic backing and the attachment flange, wherein the metallic backing is secured to the corrosion barrier with the adhesive.

11. The fan containment case as recited in claim 6, wherein the attachment flange and the metallic backing define a desired flange thickness.

12. A method of manufacturing a fan containment case comprising:
   forming a generally cylindrical case with a plurality of composite layers;
   forming an attachment flange by forming a continuous radius turned radially outward transverse to the cylindrical case with a portion of the plurality of composite layers forming the cylindrical case;
   measuring a thickness of the attachment flange;
   machining a surface of a metallic backing based on the measured thickness of the attachment flange to define a thickness of the attachment flange and the metallic backing; and
   attaching the metallic backing to the formed portion of the attachment flange with at least one fastener such that a terminating end of each fastener does not extend upstream beyond the attachment flange.

13. The method as recited in claim 12, including applying an adhesive between the metallic backing and the composite layers to secure the metallic backing to the attachment flange.

14. The method as recited in claim 13, wherein the at least one fastener comprises a plurality of rivets.

15. The method as recited in claim 12 including attaching a galvanic corrosion barrier between the metallic backing and the attachment flange.

* * * * *